Oct. 19, 1937.                   E. HIGGINS                   2,096,039
                             FLEXIBLE COUPLING
                            Filed Aug. 28, 1935
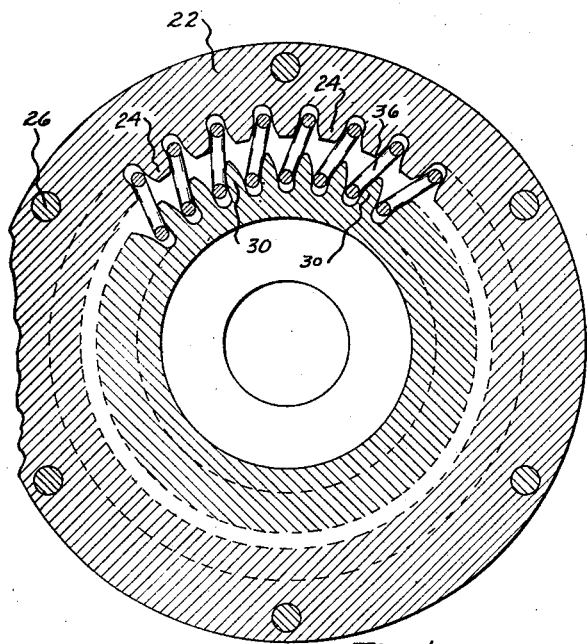
Fig. 1
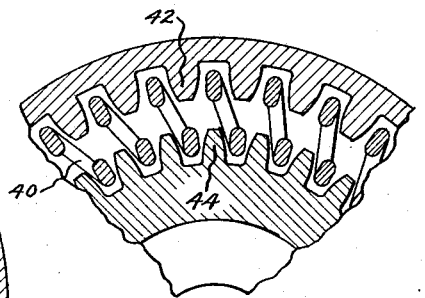
Fig. 3
Fig. 4
Fig. 5
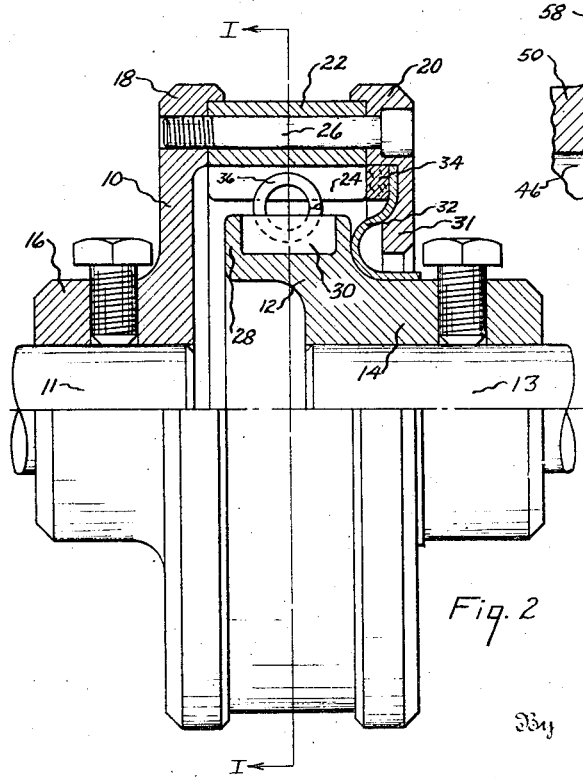
Fig. 2
Inventor
Eugene Higgins
By Beaman & Langford
Attorney Patented Oct. 19, 1937

2,096,039

UNITED STATES PATENT OFFICE 2,096,039

FLEXIBLE COUPLING

Eugene Higgins, Jackson, Mich.

Application August 28, 1935, Serial No. 38,244

3 Claims. (Cl. 64—14)

The present invention relates to flexible coupling used to transmit power from a driving member to a driven member. In most cases such members will take the form of two co-axial lengths of shafting. The functions and uses of couplings of the character to which the invention relates are well known and do not need to be herein set forth in order to fully understand the invention. In general, it may be stated that my invention is an improvement upon the type of flexible coupling disclosed in U. S. Patent No. 1,522,774.

As its primary object, the present invention provides a flexible coupling which may be inexpensively constructed and assembled and is capable of transmitting a maximum working load without loss of desired characteristics. The invention resides in the arrangement, and construction and combination of parts to be hereinafter described in detail and set forth in the appended claims for accomplishing this object and other objects and advantages which will become apparent, particularly after a consideration of the accompanying drawing wherein several embodiments of the invention are illustrated.

In the drawing,

Fig. 1 is a cross-sectional view taken on line I—I of Fig. 2 through the coupling, Fig. 2 is a side elevational view of the coupling partially shown in vertical cross-section, Fig. 3 is a fragmentary cross-section of a modified type of coil spring, Fig. 4 is a view similar to Fig. 2 of a modified construction, and Fig. 5 is a diagrammatic view of a coupling element having skewed teeth.

Generally, the invention resides in a flexible coupling comprising a pair of concentric driving and driven members having spaced opposed toothed portions. Preferably, these toothed portions take the form of cast internal and external gears or gear segments. Bridging the space between the gears and constituting a flexible driving connection is one or more helical springs having each convolution thereof disposed between adjacent teeth of opposed portions of the concentric members. The spring may be a single continuous structure extended through the entire inner and outer circumference of the toothed portion or one or more springs engaging with segments of the toothed portions or with segmental toothed portions. In one form of the invention the contacting area between the toothed portions and the spring has been increased by a departure from the conventional circular cross-sectional spring wire. Another form of the invention illustrates the teeth of the internal and external gears being skewed approximately the pitch angle of the helical spring.

Referring specifically to the drawing, the invention is exemplified in a pair of concentric members 10 and 12 having hubs 14 and 16 secured to the co-axial shaftings 11 and 13. The member 10 includes radial flanges 18 and 20 between which a ring 22 is clamped having cast teeth 24. Stud bolts 26 retain the several parts in assembled relation. The member 12 has a radial flange 28 having cast teeth 30 corresponding to the teeth 24 in the ring 22. For all practical purposes the ring 22 and flange 28 can take the form of inexpensively cast internal and external gears. As shown the flange 20 has a depending portion 31 slightly spaced from the hub 14. A flexible diaphragm 32 is clamped between the flange 20 and a gasket 34 interposed between the flanges 20 and ring 22. Preferably the diaphragm 32 is normally of lesser diameter than the hub 14 thus when expanded over the same it tightly seals the gap between the depending flange 31 and the hub 14.

A helically wound spring 36 is shown in Figs. 1 and 2 as interposed between the concentric ring 22 and flange 28 and constitutes a flexible driving connection between the members 10 and 12. Preferably the outside diameter of the spring 36 approximates the distance between the root circle of the gear teeth 24 and 30 while the pitch thereof approximates the circular pitch of the gears 24 and 30. Such an arrangement enables the spring 36 to be readily assembled in place. Moreover, the spring is normally under no material stress except during power transmission thus avoiding any tendencies to take a permanent set. In the form of the invention illustrated in Fig. 1, the gear teeth and springs are coextensive through substantially 360°. Diametrically opposite portions of each convolution of the spring 36 are located between adjacent teeth 24 and 30 of the gear portions. This gives maximum power transmission through the coupling with minimum stress upon each convolution of the spring 36. Obviously, two or more coextensive gear segments may be employed upon the ring 22 and flange 28 in lieu of continuous teeth. In such an event then separate lengths of helical springs would be associated with each set of coextensive gear segments. Moreover, with continuous teeth upon the ring 22 and flange 28, in some cases it may be desirable to employ one or more shortened lengths of springs, the convolution of which engages with less than all consecutive teeth 24 and 30.

In Fig. 3 a slightly modified form of the invention is shown in that the helical spring 40 is coiled from relatively flat wire. This has the effect of increasing the bearing surface between the spring and the teeth 42 and 44 of the coupling member.

Referring to Fig. 4, a variation in construction of the coupling from that disclosed in Fig. 2 is illustrated. The concentric members 46 and 48 include hub portions 50 and 52. A radial flange 54 having cast teeth 67 is housed by a pair of spaced radial flanges 58 and 60 supported from the hub 50. A ring 62 having cast teeth 65 engages the flanges 58 and 60; the parts being held in assembled relation by suitable cap screws 64. A helical spring 66 engages with the teeth 65 and 67 to provide a flexible coupling between the members 46 and 48.

In Fig. 5 is diagrammatically illustrated a refinement of construction in which the teeth 68 of the gear portions 70 of the coupling members are skewed at an angle approximating the pitch angle of the helical spring. It will be understood that if the teeth of both the external and internal gear portions are skewed, the teeth engaging the outer side of the convolutions of the helical spring will be angularly disposed in an opposite direction from the teeth engaging the inner side of the convolution.

The action of the spring 36, for example, differs materially from that of the spring in the aforesaid patent. Upon the transmission of power through the coupling, the spring 36 is neither compressed or extended as is usual in the action of a helical spring under a working load. Instead, either the outer or inner sides of the helical spring is racked or tilted with respect to the opposite side depending upon which gear portion is the driver. In other words, the spacing of each convolution is not materially altered yet each convolution is distorted from its normal helix and placed under a torsional strain.

It will become apparent to those skilled in the art that I have provided a compact, inexpensive, flexible coupling which may be readily assembled for installation and readily disassembled for repair or replacement of parts. Alterations and changes in construction of the toothed elements and spring or springs will undoubtedly suggest themselves in view of this exemplified disclosure of the principles of my invention. For this reason I do not desire to be limited to the details of construction herein disclosed except to the extent indicated in the appended claims.

Having described my invention, what I claim and desire to protect by Letters Patent is:

1. In a flexible coupling, a driving shaft, a driven shaft, a connecting member secured to one of said shafts, a second connecting member secured to the other of said shafts, a substantially cylindrical member projecting over said first member, a flexible connection between said first named member and said cylindrical member, an annular flange detachably connected to said cylindrical member, means to clamp said flange to said cylindrical member and said cylindrical member to said second named member, and an annular flexible diaphragm clamped at its outer portion between said substantially cylindrical member and said annular flange, said annular flange having means to deflect said flexible diaphragm inwardly of said members, said first named connecting member having means deflecting the inner portion of said diaphragm outwardly, said diaphragm completing the housing for the connection formed by said first member, said second member and said flexible connecting means.

2. In a flexible coupling, a driving shaft, a driven shaft, a connecting member secured to one of said shafts, a second connecting member secured to the other of said shafts, said second connecting member having a substantially cylindrical member projecting over said first member, external and internal toothed portions annularly arranged and concentrically disposed on said first named and second named connecting members, respectively, a helical spring disposed between said first named and second named members, the coils thereof being disposed between the spaces defined by said toothed portions, an annular flange detachably connected to a portion of the outer end of said cylindrical member, an annular recess defined by said annular flange disposed radially inwardly from its point of contact with said cylindrical member, resilient means of annular configuration disposed against a portion of the outer end of said cylindrical member radially inwardly from the point of contact of said annular flange with said cylindrical member, an annular flexible diaphragm clamped at its outer portion between said annular flange and said resilient means, said recess in said annular flange being of such configuration as to deflect said flexible diaphragm inwardly toward said connecting member, said first named connecting member having means deflecting the inner portion of said diaphragm outwardly from said connecting members, said diaphragm completing the housing for the connection formed by said first member and said flexible connecting means.

3. In a flexible coupling, a driving shaft, a driven shaft, a connecting member secured to one of said shafts, a second connecting member secured to the other of said shafts, said second connecting member having a substantially cylindrical member projecting over said first member, external and internal toothed portions annularly arranged and concentrically disposed on said first named and second named connecting members, respectively, a helical spring disposed between said first named and second named members, the coils thereof being disposed between the spaces defined by said toothed portions, an annular flange detachably connected to a portion of the outer end of said cylindrical member, an annular recess defined by said annular flange disposed radially inwardly from its point of contact with said cylindrical member, an annular flexible diaphragm clamped at its outer portion between said annular flange and said cylindrical means, said recess in said annular flange being of such configuration as to deflect said flexible diaphragm inwardly toward said connecting member, said first named connecting member having means deflecting the inner portion of said diaphragm outwardly from said connecting members, said diaphragm completing the housing for the connection formed by said first member and said flexible connecting means.

EUGENE HIGGINS.